United States Patent [19]

Lurois

[11] Patent Number: 5,769,978
[45] Date of Patent: Jun. 23, 1998

[54] TIRE HAVING A THREAD WITH LATERAL RIBS THE SURFACE OF WHICH IS RADIALLY RECESSED WITH RESPECT TO THE OTHER RIBS

[75] Inventor: Patrick Lurois, Greenville, S.C.

[73] Assignee: Compagnie Generale des Etablissments Michelin - Michelin & Cie, France

[21] Appl. No.: 681,092

[22] Filed: Jul. 22, 1996

Related U.S. Application Data

[63] Continuation of Ser. No. 386,125, Feb. 6, 1995, abandoned, which is a continuation of Ser. No. 962,781, filed as PCT/FR91/00601 Jul. 22, 1991 published as WO92/02380 Feb. 20, 1992, abandoned.

[51] Int. Cl.[6] .............................. B60C 9/20; B60C 11/01; B60C 11/04; B60C 105/00
[52] U.S. Cl. ...................................... 152/209 R; 152/535
[58] Field of Search ......................... 152/209 R, 209 D, 152/523, 526, 535

[56] References Cited

U.S. PATENT DOCUMENTS

| | | | |
|---|---|---|---|
| 3,782,438 | 1/1974 | Mirtain . | |
| 3,976,115 | 8/1976 | Mirtain et al. ....................... | 152/209 R |
| 4,082,132 | 4/1978 | Arai et al. ............................ | 152/209 R |
| 4,262,721 | 4/1981 | Tadokoro et al. ................... | 152/209 R |
| 4,360,049 | 11/1982 | Imai .................................... | 152/209 R |
| 4,480,671 | 11/1984 | Giron . | |
| 4,724,878 | 2/1988 | Kobe et al. .......................... | 152/209 R |
| 4,862,934 | 9/1989 | Yamazaki ............................ | 152/209 R |

FOREIGN PATENT DOCUMENTS

| | | | |
|---|---|---|---|
| 0384182 | 8/1990 | European Pat. Off. . | |
| 2303675 | 8/1976 | France . | |
| 1480918 | 3/1969 | Germany .......................... | 152/209 R |
| 3712155 | 10/1987 | Germany .......................... | 152/209 R |
| 0155104 | 7/1987 | Japan ................................. | 152/209 D |
| 2088311 | 3/1990 | Japan ................................. | 152/209 R |
| 0357419 | 9/1931 | United Kingdom .............. | 152/209 R |
| 1546593 | 5/1979 | United Kingdom . | |
| 1546594 | 5/1979 | United Kingdom . | |

OTHER PUBLICATIONS

English Language Tralsation of Japanese Published Patent Application No. 62–155,104 (published Jul. 10, 1987).

*Primary Examiner*—Steven D. Maki
*Attorney, Agent, or Firm*—Baker & Botts,L.L.P.

[57] ABSTRACT

In order to improve the resistance to separation between the ends of the working plies (31 to 34) of a crown reinforcement (3) and between the edges of said reinforcement (3) and the radial carcass reinforcement (2), the said plies have axial widths which are different from each other, and at least two of the widths are greater than the axial distance (L) between the median axes (XX') of the two lateral grooves (6) closest to the edges of the tread (1) and defining lateral regions (7) where the tread (1) has a meridian profile (8) radially recessed with respect to the meridian profile (9) of the geometrical envelope of its median zone.

8 Claims, 1 Drawing Sheet

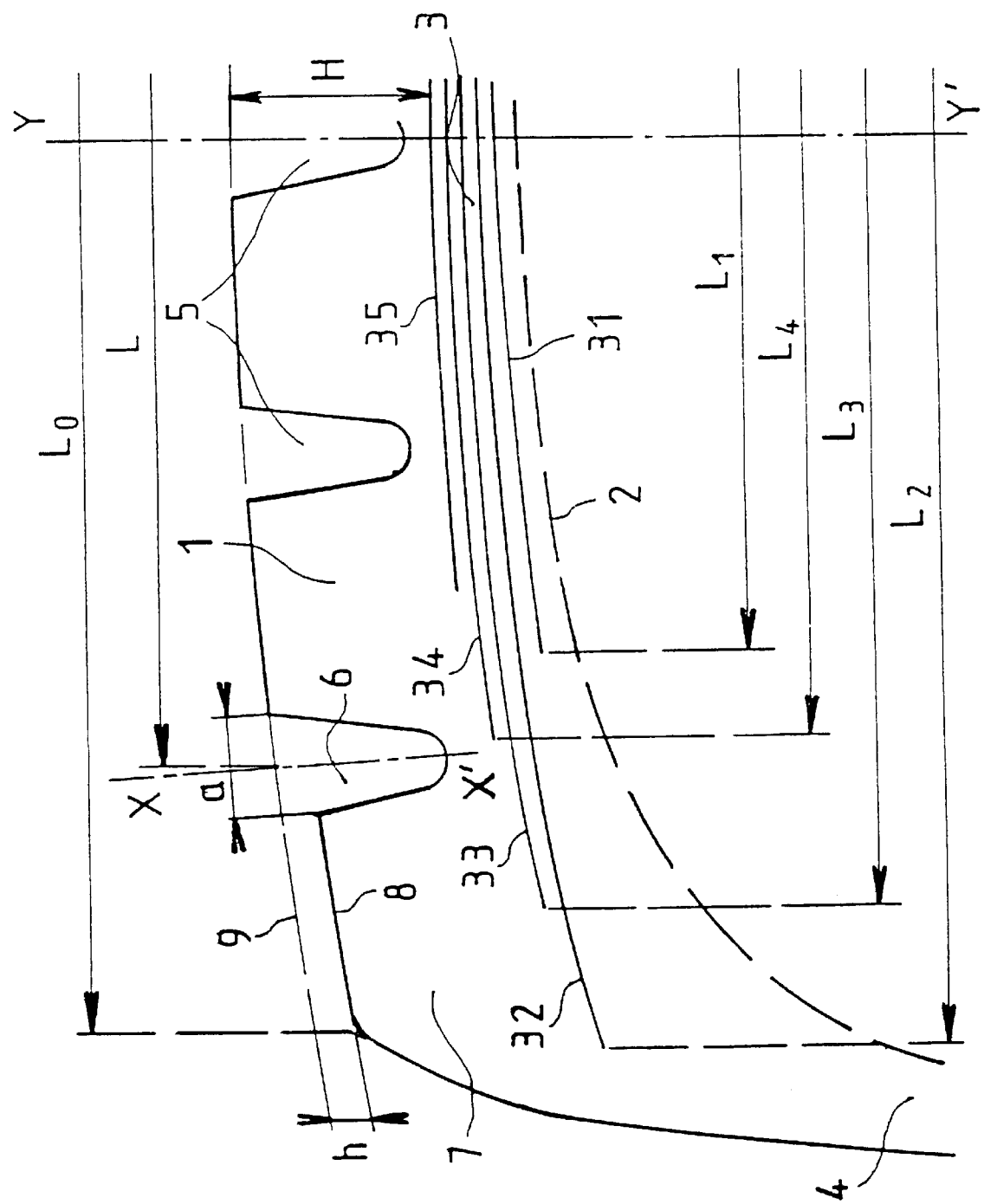

TIRE HAVING A THREAD WITH LATERAL RIBS THE SURFACE OF WHICH IS RADIALLY RECESSED WITH RESPECT TO THE OTHER RIBS

This application is a continuation of application Ser. No. 08/386,125, filed on Feb. 6, 1995, now abandoned, which is a continuation of application Ser. No. 07/962,781, filed as PCT/FR91/00601, Jul. 22, 1991, published as WO92/02380, Feb. 20, 1992, now abandoned.

BACKGROUND OF THE INVENTION

The present invention relates to new or recapped treads for tires with radial carcass reinforcement intended to equip transportation vehicles, and more particularly "heavy trucks" capable of long runs at sustained speed.

These tires comprise, in addition to the radial carcass reinforcement, a crown reinforcement formed of at least two superposed plies of substantially non-stretchable cables, preferably of steel, crossed from one ply to the following ply and forming an angle equal to at most 45° with the circumferential direction. These plies are so-called working plies. The crown reinforcement may advantageously be supplemented, on the one hand, by a ply or two half plies formed of substantially non-stretchable cables forming an angle of between 45° and 90° with the circumferential direction and, on the other hand, by one or more plies formed of elastic cables placed radially to the outside of the crown plies of substantially non-stretchable cables and forming a small angle with the circumferential direction.

The crown reinforcement is surmounted by a tread which generally has several circumferential grooves which have either linear or broken-line or undulated traces. These circumferential grooves have widths which are either identical or different. In the latter case, some grooves are wide and can be associated with narrower grooves on the same tread.

It is known from French patent 2,303,675, in order, in particular, to remedy the phenomenon of abnormal wear of the tires on the steering axle of a truck, which abnormal wear causes collapse of the edges of the tread with respect to the central part of the latter, to divide the said tread into three parts, namely a central part and two side parts, such that the central part protrudes radially outward with respect to the side parts which are hollowed and therefore radially recessed, so that only the central part is in contact with the ground upon the travel of the tire. The said central part protrudes beyond the said side parts by a radial thickness or height at least equal to the depth of maximum permissible theoretical wear, while the thickness of rubber radially to the outside of the reinforcement belt corresponds, in the side portions, to the minimum permissible value of material covering the said belt, the belt being advantageously wider than the central part of the tread.

Such treads permit less heating at the level of the reinforcement belt ends. Furthermore, as the recessed side parts are not in contact with the ground and the ends of the reinforcement belt are spaced from the bearing central part, the tendency towards separation of the crown reinforcement plies is decreased.

Despite this last-mentioned advantage, such tires do not present a satisfactory compromise of desirable performances with respect, on the one hand, to the risks of separation of the ends of the working plies of the crown reinforcement or of these plies and the carcass reinforcement and, on the other hand, the good resistance of the lateral parts to cuts and the resultant oxidation of the reinforcement cables.

The invention is based, in particular, on the surprising observation that if the existence of an offset in the meridian profile of the lateral grooves with respect to that of the central part was favorable for the decrease of the temperatures which takes place in the tire at the level of the junction of the crown reinforcement plies, this improvement was attenuated and even reversed when this recess was increased beyond a certain limit.

Thus, in accordance with the invention, a truck tire is provided with a radial carcass reinforcement, a crown reinforcement formed of at least two superposed working plies of unequal width, formed of substantially non-stretchable cables parallel to each other in each ply and crossed from one ply to the next, forming an angle with the circumferential direction of at most 45°, and of a tread of a width of $L_0$ comprising, in the side zones, a circumferential groove defining a lateral rib the meridian profile of which is substantially parallel with the meridian profile of the geometrical envelope of the principal median zone and radially recessed with respect to said profile, the widths of two crossed working plies being greater than the axial distance L between the median axes XX' of the lateral grooves, characterized by the fact that the difference in level h between the meridian profile of the median zone and the meridian profile of the lateral ribs of the tread is such that the ratio h/H is at most equal to 0.40, H being the thickness of the tread measured in the equatorial plane YY', and by the fact that the difference $L_0$–L is between 34 and 80 mm. $L_0$–L may range between 38 mm and 80 mm and h/H may range from 0.14 to 0.40 or 0.2 to 0.4. Also, $L_0$–L may range from 50 mm to 80 mm or 60 mm to 80 mm, while h/H ranges from 0.14 to 0.4.

It is known from French patent 2,525,535 that the difference in level between the meridian profile of the median zone and meridian profile of the lateral zones is between 40 and 200% of the deflection of the tire under load, this deflection range being such that the lateral parts of the tread, under the normal conditions of load and pressure, remain in contact with the ground, the axial width of the lateral rib being at most equal to the maximum depth of the grooves. The recommended difference in level, combined with the small axial width of the lateral rib, permits better road behavior of the equipped vehicle, avoiding in particular the "rail effect", and a substantial improvement in the transverse adherence of the steering tires.

The widths of at least two plies having cables crossed from one ply to the other are preferably greater than the axial distance L by at least 20 mm.

In order not to penalize the tire with respect to road wear, it is advantageous for the width of the lateral rib to be less than the width of the rib axially adjacent to said lateral rib. Likewise, in known manner, it is advantageous for the lateral grooves, which are spaced apart by the width L, to have widths a of between 0.6 and 8 mm, depending on the dimensions of the tires, which remain at all times less than 0.02 times the width $L_0$ of the tread of the tire in question.

DESCRIPTION OF DRAWING

For a complete understanding of the invention, reference can be made to the accompanying drawing which is a single FIGURE showing a radial section of half the tread of a tire and to the nonlimitative embodiments of the invention described below.

DESCRIPTION OF PREFERRED EMBODIMENTS

The drawing shows half of the tread 1 of a tire with radial carcass 2 reinforced by a crown reinforcement 3. The latter is formed of four plies 31, 32, 33, 34 known as working plies, formed of substantially non-stretchable cables which are parallel to each other in each ply and crossed from ply 31 to ply 32, from ply 32 to ply 33 and so on, forming an angle of 18° with the circumferential direction. Furthermore, this working reinforcement is supplemented by a protective ply 35 formed of elastic cables forming angles of 18° with the circumferential direction.

The tread is extended on each side by a sidewall 4 and, in known manner, has circumferential grooves 5, 6, possibly of different width, of circular, undulated or zigzag trace. In the lateral zone of the tread 1, the circumferential groove 6 defines a lateral rib 7, the meridian profile 8 of which is parallel to and on the inner side of the meridian profile 9 of the geometrical envelope of the principal median zone of the tread 1.

In the case of a radial tire of size 11 R 22.5, this groove 6 has, for instance, a width a of 4 mm, namely 2% of the width of the tread $L_0$ of 200 mm. The difference h in level between the profile 8 and the meridian profile 9 is 4 mm, while the thickness H of the tread, measured in the equatorial plane YY', is 21 mm, which gives a ratio h/H equal to 0.19.

The axial distance L between the median axes XX' of the circumferential grooves 6 is equal to 140 mm, so that the difference $L_0$–L equals 60 mm. If one considers the four working plies 31, 32, 33, 34, at least two of these plies 32 and 33 have widths $L_2$ and $L_3$ greater than the width L by at least 20 mm, $L_2$ being equal to 170 mm and $L_3$ to 162 mm, all these widths being centered on the trace of the equatorial plane YY'.

Another example (not shown) in accordance with the invention consists in having the same tread 1 as that described and shown in the drawing, with a crown reinforcement formed only of two working plies 32 and 33, but supplemented by a triangulation ply of substantially non-stretchable fibers oriented at 65° and by a protective ply having the width of the ply 34 of the example described.

This second type of tire according to the invention has been the object of intensive tests and, in particular, travel on the highway in size 385/65 R 22.5. Under conditions of load of 5000 kg/tire and a pressure of 8 bars cold, and for an average speed of 105 km/hr, control tires traveled an average of 25,490 kms (6 tires) before the appearance of evident signs of inter-ply separation, while the tires of the invention traveled on the average 92,100 kms (4 tires) before the same signs appeared.

I claim:

1. A tire for trucks provided with a radial carcass reinforcement (2), a crown reinforcement (3) formed of at least two working plies (31, 32, 33, 34) of unequal widths and formed of substantially non-stretchable cables parallel to each other in each ply and crossed from one ply to the next forming an angle of at most 45° with a circumferential direction, and a tread (1) having in each lateral zone a circumferential groove (6) defining a lateral rib (7) and a circumferential groove (5) defining a rib axially adjacent the lateral rib, the width of the lateral rib being less than the width of the adjacent rib, the meridian profile of the lateral rib being substantially parallel to the meridian profile (9) of the geometrical envelope of the principal median zone and radially recessed with respect to said meridian profile of the geometrical envelope of the median zone, the widths ($L_1$, $L_2$, $L_3$, $L_4$) of at least two working plies having cables crossed from one ply to the other being greater than the axial distance L between the median axes XX' of the circumferential grooves (6) in the lateral zones, characterized by the fact that the difference in level h between the meridian profile of the median zone and the meridian profile of the lateral ribs (7) of the tread (1) is such that the ratio h/H is from 0.07 to 0.40, H being the thickness of the tread (1) measured in the equatorial plane YY', and by the fact that the difference $L_0$–L is greater than 38 mm and less than or equal to 80 mm, $L_0$ being the axial width of the tread.

2. A tire according to claim 1, characterized by the fact that the widths ($L_1$, $L_2$, $L_3$, $L_4$) of at least two plies having cables crossed from one ply to the other are equal to or greater than the quantity L+20 mm.

3. A tire according to claim 1, characterized by the fact that the widths ($L_1$, $L_2$, $L_3$, $L_4$) of the at least two plies differ from each other by at least 4 mm.

4. A tire according to claim 1, characterized by the fact that the circumferential groove (6) in the lateral zone has a width a of between 0.6 and 8 mm, being less than 0.02 times the width ($L_0$) of the tread (1).

5. A tire as set forth in claim 1 in which the meridian profile of the lateral ribs of the tread is such that the ratio h/H is in the range of between 0.14 and 0.4.

6. A tire as set forth in claim 1 in which the meridian profile of the lateral ribs and the tread is such that the ratio h/H is in the range of 0.2 and 0.4.

7. A tire as set forth in claim 5 in which $L_0$–L is in the range of 50 mm to 80 mm.

8. A tire as set forth in claim 5 in which $L_0$–L is in the range of 60 mm to 80 mm.

* * * * *

UNITED STATES PATENT AND TRADEMARK OFFICE
CERTIFICATE OF CORRECTION

PATENT NO. : 5,769,978
DATED : June 23, 1998
INVENTOR(S) : Patrick Lurois

It is certified that error appears in the above-identified patent and that said Letters Patent is hereby corrected as shown below:

On the title page, item [30], should read:

France 90/09727 filed July 27, 1990.

Signed and Sealed this

Twenty-second Day of December, 1998

Attest:

BRUCE LEHMAN

*Attesting Officer*      *Commissioner of Patents and Trademarks*